(12) United States Patent
Wang et al.

(10) Patent No.: US 9,866,328 B2
(45) Date of Patent: Jan. 9, 2018

(54) OPTICAL MODULE

(71) Applicant: InnoLight Technology (Suzhou) LTD., Suzhou (CN)

(72) Inventors: Xiangzhong Wang, Suzhou (CN); Yuzhou Sun, Suzhou (CN); Kewu Wang, Sushou (CN); Xiaoming Xu, Suzhou (CN)

(73) Assignee: InnoLight Technology (Suzhou) LTD., Suzhou (CN)

( * ) Notice: Subject to any disclaimer, the term of this patent is extended or adjusted under 35 U.S.C. 154(b) by 0 days.

(21) Appl. No.: 14/699,796

(22) Filed: Apr. 29, 2015

(65) Prior Publication Data
US 2016/0191166 A1 Jun. 30, 2016

(30) Foreign Application Priority Data

Dec. 31, 2014 (CN) .......................... 2014 1 0851476

(51) Int. Cl.
*H04B 10/00* (2013.01)
*H04B 10/40* (2013.01)
*G02B 6/42* (2006.01)

(52) U.S. Cl.
CPC .............. *H04B 10/40* (2013.01); *G02B 6/42* (2013.01)

(58) Field of Classification Search
CPC H04B 10/40; H04B 10/2503; H04B 10/2575; H04J 14/02; G02B 6/4246; G02B 6/4278; G02B 6/4292
USPC ......... 398/135, 136, 137, 138, 139, 164, 79, 398/158, 159; 385/88, 89, 90, 92, 93
See application file for complete search history.

(56) References Cited

U.S. PATENT DOCUMENTS

| | | | | |
|---|---|---|---|---|
| 7,785,020 | B2 * | 8/2010 | Kim ..................... | G02B 6/4246 385/88 |
| 9,363,020 | B2 * | 6/2016 | Kurashima ............ | H04B 10/40 |
| 9,419,717 | B2 * | 8/2016 | Huang .................. | G01J 1/0271 |
| 2005/0084269 | A1 * | 4/2005 | Dallesasse ........... | G02B 6/4201 398/135 |
| 2007/0058980 | A1 * | 3/2007 | Hidaka ................ | G02B 6/4201 398/138 |
| 2012/0039572 | A1 * | 2/2012 | Amirkiai .............. | G02B 6/4278 385/88 |
| 2013/0001410 | A1 * | 1/2013 | Zhao .................... | H05K 1/0298 250/227.11 |

* cited by examiner

*Primary Examiner* — Hanh Phan
(74) *Attorney, Agent, or Firm* — Finnegan, Henderson, Farabow, Garrett & Dunner, LLP (57) ABSTRACT

An optical module includes an optical fiber connector, a transmitter optical component, a receiver optical component and a printed circuit board arranged within an optical module housing; the transmitter optical component and the receiver optical component are optically coupled to the optical fiber connector, and electrically connected to the printed circuit board which is arranged horizontally within the optical module housing. The transmitter optical component and the receiver optical component are stacked in a direction perpendicular to the printed circuit board. Stacking the transmitter optical component and the receiver optical component makes use of the width of the optical module by improving design flexibility of the optical path and the electric circuit, reducing or even substantially eliminating crosstalk between the high-speed devices and high-speed signals, and improving the heat dissipation effect of the optical module.

10 Claims, 7 Drawing Sheets

OPTICAL MODULE

CROSS REFERENCE TO RELATED APPLICATION

This application claims the priority benefit of Chinese Patent Application No. 201410851476.6, filed on Dec. 31, 2014, the contents of which are incorporated by reference herein in their entirety for all purposes.

FIELD

The present disclosure relates generally to the field of communication technology, and more particularly, to an optical module.

BACKGROUND

Figure 1:
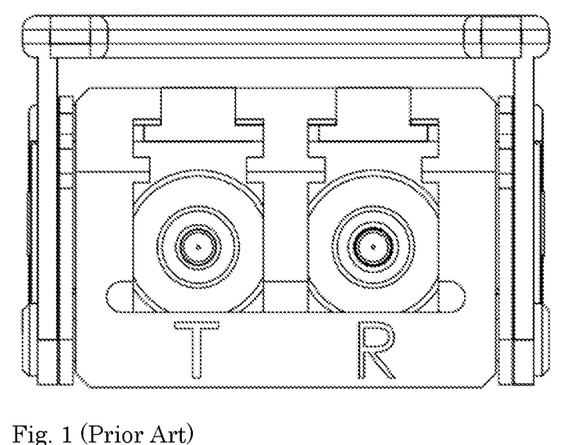
FIG. 1 is a schematic diagram illustrating an optical fiber connector in a QSFP+ module in the prior art where the transmitting interface and the receiving interface are arranged from left to right.

In accordance with provisions of present industry standards of an optical module (such as SFP, SFP+, QSFP+, CFP, CFP2 and CFP4) for signals of an optical fiber connector, an optical interface and an electrical interface of a transmitter or a receiver are designed to be arranged on a modular structure from left to right in X direction, while a transmitting interface and a receiving interface of the optical fiber connector are designed to be arranged in the same horizontal plane parallel to the X axis from left to right (please refer to FIG. 1, a schematic diagram illustrating an optical fiber connector in a QSFP+ module in the prior art where the transmitting interface and the receiving interface are arranged from left to right, and in which T represents the transmitting interface, and R represents the receiving interface), and a transmitter high-speed signal interface and a receiver high-speed signal interface of electrical interfaces of a printed circuit board are also designed to be arranged on the printed circuit board from left to right.

Figure 2:
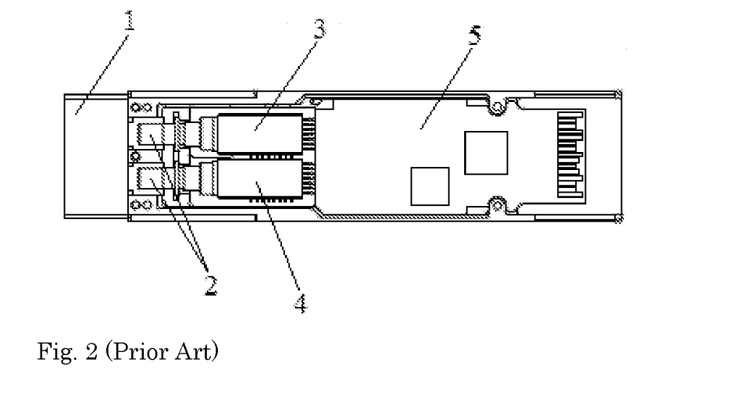
FIG. 2 is a schematic diagram illustrating a QSFP+ module in the prior art where the transmitter optical component and the receiver optical component are arranged from left to right.

In the prior art, a transmitter optical component and a receiver optical component are arranged inside the optical module from left to right accordingly, that is, the transmitter optical component and the receiver optical component correspond to the transmitting interface and the receiving interface of the optical fiber connector. Also take an example of the structure of the QSFP+ module in the prior art. Please refer to FIG. 2, which is a schematic diagram illustrating a QSFP+ module in the prior art where the transmitter optical component and the receiver optical component are arranged from left to right. As shown, the QSFP+ module includes a housing 1, an optical fiber connector 2, a transmitter optical component 3, a receiver optical component 4 and a printed circuit board 5 within the housing 1. The transmitter optical component 3 and the receiver optical component 4 are coupled to the optical fiber connector 2, and are electrically connected to the printed circuit board 5. The transmitter optical component 3 and the receiver optical component 4 are arranged in the housing 1 from left to right. In such arrangement, the transmitter optical component and the receiver optical component are limited and can only use a half of the module's width respectively, resulting in following defects of the optical module.

Firstly, the transmitter optical component and the receiver optical component can only use a half of the module's width respectively, so the layout of high-speed devices and high-speed signals related to the transmitter optical component, the receiver optical component, the printed circuit board and the electrical connection devices therebetween is restrained. In other words, the layout of the transmitter optical component and the receiver optical component arranged side by side in the prior art brings some limitations to the design of the electric circuit and the optical path in the optical module. In addition, the space limitation may result in a limited gap between signal channels in the optical modules, so that it is easy to cause crosstalk between the signal channels.

Secondly, the transmitter optical component generates more heat than the receiver optical component, so the layout of the transmitter optical component and the receiver optical component arranged side by side will cause heat mainly concentrated on one side of the optical module, which is bad for heat dissipation of the transmitter optical component, and further influencing the heat dissipation effect of the whole optical module.

Figure 3:
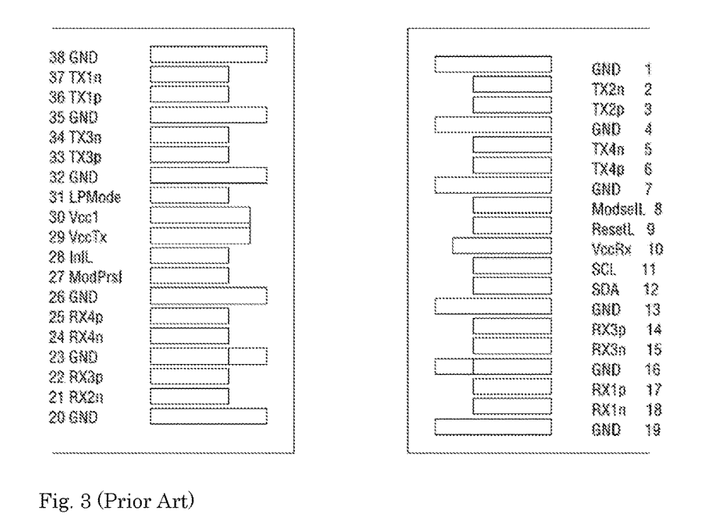
FIG. 3 is a schematic diagram illustrating a definition of an electrical interface of a printed circuit board in a QSFP+ module in the prior art.

In addition, in the prior art, a typical printed circuit board includes a substrate, a transmitter optical component interface, a receiver optical component interface and an electrical interface, with the electrical interface further including a transmitter data interface and a receiver data interface. The transmitter optical component interface and the receiver optical component interface of the printed circuit board are arranged on a surface of the substrate, the transmitter optical component interface is configured to be coupled to a transmitter optical component in the optical module, and the receiver optical component interface is configured to be coupled to a receiver optical component in the optical module. In the prior art, the transmitter optical component and the receiver optical component in the optical module are arranged on the modular structure from left to right in X direction, so the transmitter optical component interface and the receiver optical component interface are arrange on the surface of the substrate side by side accordingly. The transmitter data interface and the receiver data interface of the printed circuit board are also arranged on the surface of the substrate, and the transmitter data interface and the receiver data interface are designed to be arranged on the substrate to the left and to the right respectively, according to the present optical module industry standards (such as SFP, SFP+, QSFP+, CFP, CFP2 and CFP4). Please refer to FIG. 3, which is a schematic diagram showing the definition of the electrical interface of the printed circuit board in a QSFP+ module in the prior art. As shown, the electrical interface is designed to have 38 contacts, wherein the transmitter data interface in the electrical interface is arranged on the upper and lower surfaces of the substrate (hereinafter referred to as first surface and second surface respectively), the receiver data interface in the electrical interface is arranged on the upper and lower surfaces of the substrate, and the transmitter data interface and the receiver data interface are arranged on the substrate side by side. In other words, some of the contacts of the transmitter data interface are arranged on the first surface and the other contacts of the transmitter data interface are arranged on the second surface, and the contacts on the first surface and the contacts on the second surface are both arranged on the left (or right) of the substrate; and some of the contacts of the receiver data interface are arranged on the first surface and the other contacts of the receiver data interface are arranged on the second surface, and the contacts on the first surface and the contacts on the second surface are both arranged on the right (or left) of the substrate. In the printed circuit board, the transmitter optical component interface and the transmitter data interface are coupled with each other by wiring on the printed circuit board to form a transmitter data transmission path, and the receiver optical component interface and the receiver data interface are coupled with each other by wiring on the printed circuit to form a receiver data transmission path.

The above printed circuit board in the prior art has the following disadvantages. Firstly, the transmitter data transmission path and the receiver data transmission path are arranged on the same surface of the printed circuit board, so it causes crosstalk between the transmitter data transmission path and the receiver data transmission path. Secondly, the transmitter optical component interface and the receiver optical component interface are arranged on one surface of the printed circuit board, while the transmitter data interface and the receiver data interface are arranged on two surfaces of the printed circuit board, so when the transmitter data transmission path and the receiver data transmission path are formed, some circuit board wires on one surface of the printed circuit board are required to be connected to the other surface of the printed circuit board via one or more via holes, which causes the signal integrity worse.

SUMMARY

In order to overcome the above defects in the prior art, it is an object of the present disclosure to provide an optical module, including an optical module housing, an optical fiber connector, a transmitter optical component, a receiver optical component and a printed circuit board, wherein the transmitter optical component, the receiver optical component and the printed circuit board are arranged in the optical module housing, the transmitter optical component and the receiver optical component are optically coupled to the optical fiber connector, and electrically connected to the printed circuit board, the printed circuit board is arranged horizontally within the optical module housing, and the transmitter optical component and the receiver optical component are stacked in a direction perpendicular to the printed circuit board. According to an aspect of the disclosure, in the optical module, the transmitter optical component includes a light-emitting device group, a first optical path coupling device and a first printed circuit board signal connector, wherein the light-emitting device group is optically coupled to the optical fiber connector via the first optical path coupling device, and the light-emitting device group is electrically connected to the printed circuit board via the first printed circuit board signal connector; and the receiver optical component includes a light-receiving device group, a second optical path coupling device and a second printed circuit board signal connector, wherein the light-receiving device group is optically coupled to the optical fiber connector via the second optical path coupling device, and the light-receiving device group is electrically connected to the printed circuit board via the second printed circuit board signal connector.

According to another aspect of the disclosure, in the optical module, the first printed circuit board signal connector and the second printed circuit board signal connector are flexible printed circuit boards.

According to a further aspect of the disclosure, in the optical module, the optical module housing includes an upper housing and a lower housing; the transmitter optical component further includes a transmitter optical component housing, the light-emitting device group are arranged within the transmitter optical component housing, and the transmitter optical component housing is in direct contact with the upper housing or in heat-transfer contact with the upper housing via heat conduction material; and the receiver optical component further includes a receiver optical component housing, the light-receiving device group are arranged in the receiver optical component housing, and the receiver optical component housing is in direct contact with the lower housing or in heat-transfer contact with the lower housing via heat conduction material.

According to a further aspect of the disclosure, in the optical module, the first optical path coupling device includes a first light-plane convertor which is configured to convert and connect the light plane and is arranged between the light-emitting device group and the optical fiber connector; and/or the second optical path coupling device includes a second light-plane convertor which is configured to convert and connect the light plane and is arranged between the light-receiving device group and the optical fiber connector.

According to a further aspect of the disclosure, in the optical module, the printed circuit board includes a substrate, a transmitter optical component interface, a receiver optical component interface, an electrical interface, a first circuit board wiring and a second circuit board wiring, wherein the electrical interface includes a transmitter data interface and a receiver data interface; the substrate includes a first surface and a second surface opposite to the first surface; the transmitter optical component interface is coupled to the first printed circuit board signal connector to form the electric connection, and the transmitter optical component interface and the transmitter data interface are arranged on the first surface and coupled with each other via the first circuit board wiring to form a transmitter data transmission path; and the receiver optical component interface is coupled to the second printed circuit board signal connector to form the electric connection, and the receiver optical component interface and the receiver data interface are arranged on the second surface and coupled with each other via the second circuit board wiring to form a receiver data transmission path.

According to a further aspect of the disclosure, in the optical module, the first circuit board wiring is arranged on the first surface; and/or the second circuit board wiring is arranged on the second surface.

According to a further aspect of the disclosure, in the optical module, the substrate adopts a multi-layer pressured laminated structure.

According to a further aspect of the disclosure, in the optical module, the printed circuit board further includes a transmitted signal processing chip which is arranged on the first surface and coupled to the transmitter optical component interface and the transmitter data interface respectively via the first circuit board wiring; and/or received signal processing chip which is arranged on the second surface and coupled to the receiver optical component interface and the receiver data interface respectively via the second circuit board wiring.

According to a further aspect of the disclosure, in the optical module, the transmitted signal processing chip is a chip selected from the group consisting of clock and data recovery chip, laser driver chip and/or multiplex and de-multiplex chip; and the received signal processing chip is a chip selected from the group consisting of clock and data recovery chip, post amplifier chip and/or multiplex and de-multiplex chip.

Compared with the current technology, the optical module of the disclosure has the advantage that the transmitter optical component and the receiver optical component can both make the most of the width of the optical module by being arranged into a stack in the optical module. Compared with the optical module in the prior art that the transmitter optical component and the receiver optical component are arranged side by side, the optical module of the disclosure on one hand can accommodate more signal channels or increase the distance between the signal channels to improve the design flexibility of the optical path and the electric circuit in the optical module. On the other hand, it can form a thermal path with a large area, which is beneficial to the heat dissipation of the transmitter optical component and the receiver optical component, to improve the heat dissipation effect of the optical module. In addition, by arranging the transmitter optical component interface and the transmitter data interface in the electrical interface on one surface of the printed circuit board and forming a transmitter data transmission path accordingly, and by arranging the receiver optical component interface and the receiver data interface in the electrical interface on the other surface of the printed circuit board and forming a receiver data transmission path accordingly, the transmitter data transmission path and the receiver data transmission path are formed on two surfaces of the printed circuit board and in the signal layers near the two surfaces respectively, to ensure there is no intersection between the transmitter data transmission path and the receiver data transmission path, in this way, on one hand, it can effectively reduce or even substantially eliminate the crosstalk between the transmitter data transmission path and the receiver data transmission path, and on the other hand, it can effectively reduce the height and number of the via holes in the printed circuit board, or even substantially eliminate the via hole, which greatly improves the signal integrity.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

Like reference numerals in the drawings refer to like elements.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 4:
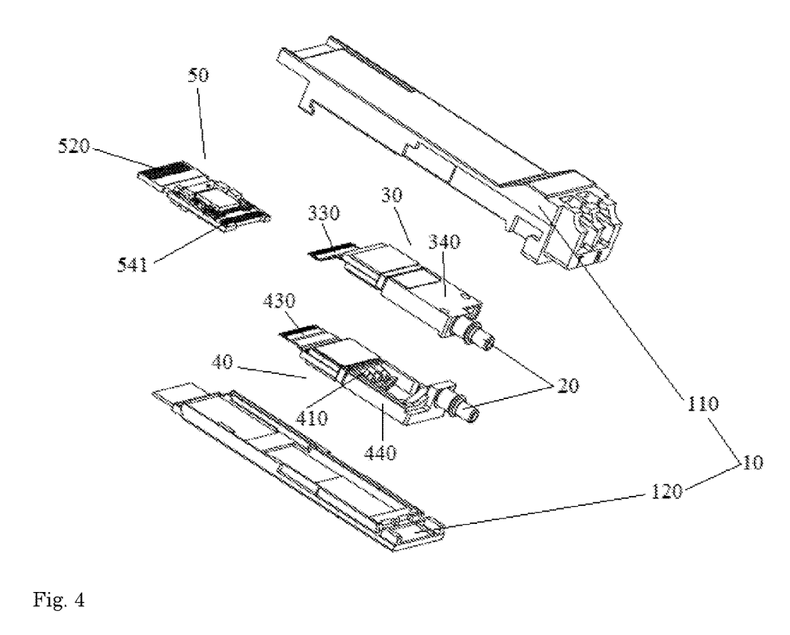
FIG. 4 is an exploded diagram illustrating an optical module according to one embodiment of the present disclosure.
Figure 5:
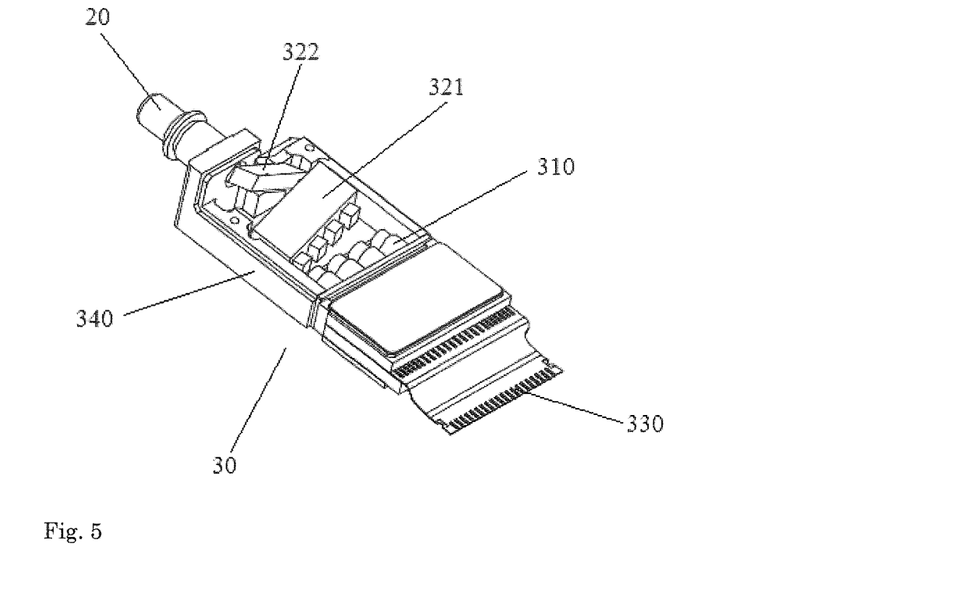
FIG. 5 is a structural schematic diagram illustrating a light-plane convertor according to one embodiment of the present disclosure.
Figure 6:
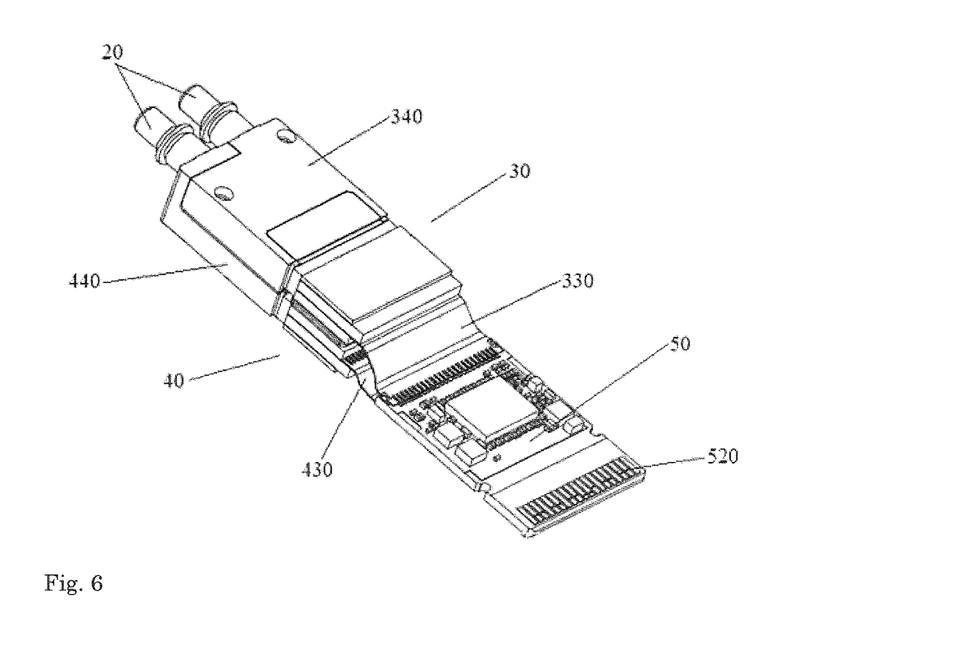
FIG. 6 is a structural schematic diagram illustrating the interior of an optical module according to one embodiment of the present disclosure.

The optical module of the present disclosure will be illustrated by a specific embodiment. Please refer to FIGS. 4-6, in which FIG. 4 is an exploded diagram illustrating an optical module according to one embodiment of the present disclosure, FIG. 5 is a structural schematic diagram illustrating a light-plane convertor according to one embodiment of the present disclosure and FIG. 6 is a structural schematic diagram illustrating the interior of an optical module according to one embodiment of the present disclosure. As shown, the optical module includes an optical module housing 10, an optical fiber connector 20, a transmitter optical component 30, a receiver optical component 40 and a printed circuit board 50, wherein the transmitter optical component 30, the receiver optical component 40 and the printed circuit board 50 are arranged within the optical module housing 10, the transmitter optical component 30 and the receiver optical component 40 are optically coupled to the optical fiber connector 20, and electrically connected to the printed circuit board 50, the printed circuit board 50 is arranged in the optical module housing 10 horizontally, and the transmitter optical component 30 and the receiver optical component 40 are stacked in a direction perpendicular to the printed circuit board 50.

Specifically, the transmitter optical component 30 includes a light-emitting device group 310, a first optical path coupling device and a first printed circuit board signal connector 330. The light-emitting device group 310 is configured to transform electrical signal into light signal. In one embodiment, the light-emitting device group 310 may be a high-speed laser array, or may be a combination of a plurality of single channel lasers. The first optical path coupling device is configured to couple the light-emitting device group 310 to the optical fiber connector 20. The first printed circuit board signal connector 330 is configured to electrically connect the light-emitting device group 310 to the printed circuit board 50. The first printed circuit board signal connector 330 preferably adopts a flexible printed circuit board. In other embodiments, the transmitter optical component 30 may further includes a driver chip for the light-emitting device group according to the actual needs, and there is no need to enumerate all devices possibly included in the transmitter optical component 30 for brevity.

The receiver optical component 40 includes a light-receiving device group 410, a second optical path coupling device (not shown) and a second printed circuit board signal connector 430. The light-receiving device group 410 is configured to transform light signal into electrical signal. In one embodiment, the light-receiving device group 410 may be a high-speed photoelectric diode array, or may be a combination of a plurality of single channel photoelectric diodes. The second optical path coupling device is configured to couple the light-receiving device group 410 to the optical fiber connector 20. The second printed circuit board signal connector 430 is configured to electrically connect the light-receiving device group 410 to the printed circuit board 50. The second printed circuit board signal connector 430 preferably adopts a flexible printed circuit board. In other embodiments, the receiver optical component 40 may further includes an amplifier chip according to the actual needs, and there is no need to enumerate all devices possibly included in the receiver optical component 40 for brevity.

The printed circuit board 50 is arranged in the optical module housing 10 horizontally, that is, the printed circuit board 50 is parallel to the upper surface and lower surface of the optical module housing 10. The transmitter optical component 30 and the receiver optical component 40 are stacked in a direction perpendicular to the printed circuit board 50. In other words, the printed circuit board 50, the transmitter optical component 30 and the receiver optical component 40 are arranged to be parallel (or substantially parallel, a specified tolerance range may be allowed) to each other, or the printed circuit board 50 and the transmitter optical component 30 or the receiver optical component 40 are in the same plane. In one embodiment, the printed circuit board 50 and the transmitter optical component 30 are in the same plane, while the printed circuit board 50 and the receiver optical component 40 are in different planes; and in another embodiment, the printed circuit board 50, the transmitter optical component 30 and the receiver optical component 40 are in different planes. Preferably, the light-emitting device group 310 in the transmitter optical component 30 is arranged in the first plane, and the light-receiving device group 410 in the receiver optical component 40 is arranged in the second plane, and the first plane, the second plane and the plane of the printed circuit board 50 are parallel (or substantially parallel) to each other.

In one exemplary embodiment, as shown in FIG. 4, the optical module housing 10 further includes an upper housing 110 and a lower housing 120. The transmitter optical component 30, the receiver optical component 40 and the printed circuit board 50 are arranged in the optical module housing 10, that is, the transmitter optical component 30, the receiver optical component 40 and the printed circuit board 50 are arranged between the upper housing 110 and the lower housing 120. In general, the surface of the upper housing 110 may be used as a main heat-dissipating surface. The transmitter optical component 30 generally produces more heat than the receiver optical component 40, so when arranging the transmitter optical component 30 and the receiver optical component 40, the transmitter optical component 30 is preferably arranged at a side close to the upper housing 11, and the receiver optical component 40 is preferably arranged at a side close to the lower housing 120, that is, the upper housing 110, the transmitter optical component 30, the receiver optical component 40 and the lower housing 120 are arranged in order in the direction from the upper housing 110 to the lower housing 120. In addition, to facilitate the heat dissipation of the transmitter optical component 30, the upper housing 110 may be thickened, or provided with a heat-dissipation device.

Further, the transmitter optical component 30 further includes a transmitter optical component housing 340, and the light-emitting device group 310 are arranged in the transmitter optical component housing 340 (for example, the light-emitting device group 310 is coupled to the inner side of the transmitter optical component housing 340). The receiver optical component 40 further includes a receiver optical component housing 440, the light-receiving device group 410 are arranged in the receiver optical component housing 440 (for example, the light-receiving device group 410 is coupled to the inner side of the receiver optical component housing 440). Preferably, the transmitter optical component housing 340 may be in direct contact with the inner side of the upper housing 110 in the optical module housing 10 or in heat-transfer contact with the inner side of the upper housing 110 in the optical module housing 10 via heat conduction material, and the receiver optical component housing 440 may be in direct contact with the inner side of the lower housing 120 in the optical module housing 10 or in heat-transfer contact with the inner side of the lower housing 120 in the optical module housing 10 via heat conduction material, so as to form a thermal path with a large area, which minimizes the thermal resistance from the transmitter optical component 30 to the surface of the upper hosing 110 and the thermal resistance from the receiver optical component 40 to the surface of the lower housing 120, to achieve good heat dissipation.

In same embodiments, it should be noted that the transmitter optical component 30 and the receiver optical component 40 may have separate housings, that is, the transmitter optical component housing 340 and the receiver optical component housing 440 are independent of each other. In other embodiments, the transmitter optical component 30 and the receiver optical component 40 may share the same housing, that is, the transmitter optical component housing 340 and the receiver optical component housing 440 are integrated.

The optical fiber connector 20 includes a transmitting interface optically coupled with the transmitter optical component 30, and a receiving interface optically coupled with the receiver optical component 40.

The light-emitting device group 310 in the transmitter optical component 30 is optically coupled to the transmitting interface in the optical fiber connector 20 via a first optical path coupling device. The light-emitting device group 310 and the transmitting interface in the optical fiber connector 20 may be arranged in the same plane, or may be arranged in different planes. For the case that the light-emitting device group 310 and the transmitting interface in the optical fiber connector 20 are arrange in different planes, the first optical path coupling device further includes a first light-plane convertor which is arranged between the light-emitting device group 310 and the optical fiber connector 20 and is configured to achieve the conversion and connection of the light planes of the light-emitting device group 310 and the optical fiber connector 20. For a single laser docking, the first light-plane convertor may be implemented by a prism. Please refer to FIG. 5, which is a structural schematic diagram illustrating a light-plane convertor according to one embodiment of the present disclosure. As shown in FIG. 5, the first light-plane convertor consists of a beam splitter prism 321 and a optical path transition prism 322. For the multi-fiber coupling, the first light-plane convertor may be implemented by a jumper.

Figure 7:
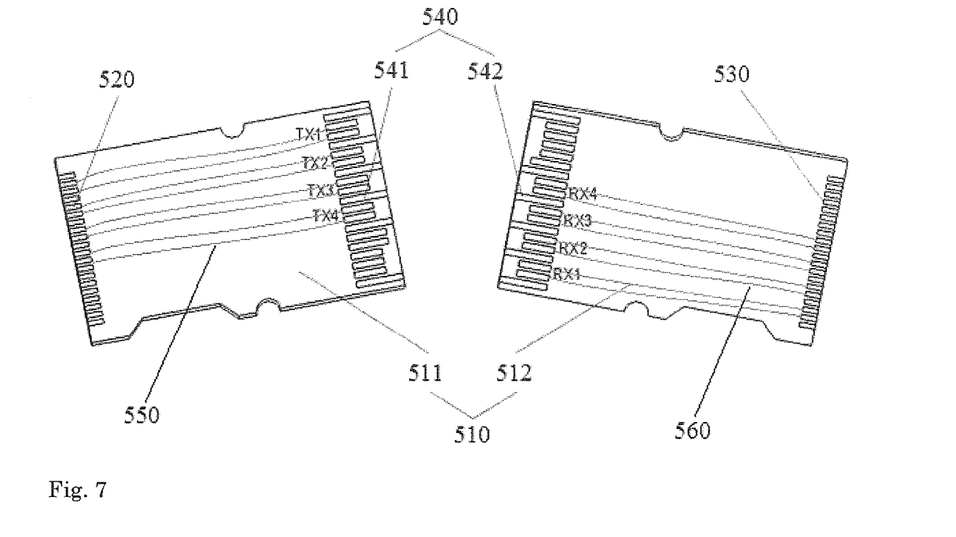
FIG. 7 is a structural schematic diagram illustrating a first surface and a second surface of a printed circuit board according to one embodiment of the present disclosure.
Figure 8:
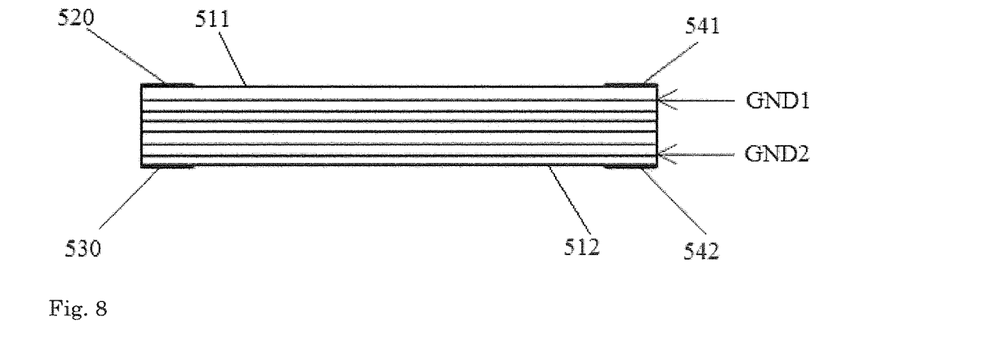
FIG. 8 is a sectional diagram of the printed circuit board of FIG. 7.

The light-receiving device group 410 in the receiver optical component 40 is optically coupled to the receiving interface in the optical fiber connector 20 via a second optical path coupling device. The light-receiving device group 410 and the receiving interface in the optical fiber connector 20 may be arranged in the same plane, or may be arranged in different planes. For the case that the light-receiving device group 410 and the receiving interface in the optical fiber connector 20 are arrange in different planes, the second optical path coupling device further includes a second light-plane convertor which is arranged between the light-receiving device group 410 and the optical fiber connector 20 and is configured to achieve the conversion and connection of the light planes of the light-receiving device group 410 and the optical fiber connector 20. For a single laser docking, the second light-plane convertor may be implemented by a prism. For the multi-fiber coupling, the second light-plane convertor may be implemented by a jumper The printed circuit board 50 is illustrated below. Please refer to FIGS. 7 and 8, FIG. 7 is a structural schematic diagram illustrating a first surface and a second surface of a printed circuit board according to one embodiment of the present disclosure, and FIG. 8 is a sectional diagram of the printed circuit board of FIG. 7. As shown, the printed circuit board 50 includes a substrate 510, a transmitter optical component interface 520, a receiver optical component interface 530, an electrical interface 540, a first circuit board wiring 550 and a second circuit board wiring 560, wherein the electrical interface 540 includes a transmitter data interface 541 and a receiver data interface 542.

The substrate 510 includes a first surface 511 and a second surface 512 opposite to the first surface.

The transmitter optical component interface 520 is coupled to the first printed circuit board signal connector 330 to form the electric connection, and the transmitter optical component interface 520 and the transmitter data interface 541 are arranged on the first surface 511 and coupled with each other via the first circuit board wiring 550 to form a transmitter data transmission path.

The receiver optical component interface 530 is coupled to the second printed circuit board signal connector 430 to form the electric connection, and the receiver optical component interface 530 and the receiver data interface 542 are arranged on the second surface 512 and coupled with each other via the second circuit board wiring 560 to form a receiver data transmission path.

Specifically, as shown in FIG. 8, the substrate 510 adopts a multi-layer pressured laminated structure. In general, the number of layers in the substrate 510 is from six to ten. It should be noted that the physical structure of the substrate 510 is well known to those skilled in the art, there is no need to explain every layer of the substrate 510. The substrate 510 has two surfaces opposite to each other, and the two surfaces are indicated by first surface 511 and second surface 512 hereinafter respectively.

The transmitter optical component interface 520 is coupled to the first printed circuit board signal connector 330 in the transmitter optical component 30 to achieve the electric connection with the transmitter optical component 30 in the optical module, and the receiver optical component interface 530 is coupled to the second printed circuit board signal connector 40 in the receiver optical component 40 to achieve the electric connection with the receiver optical component 40 in the optical module. The transmitter optical component interface 520 is arranged on the first surface 511 of the substrate 510, the receiver optical component interface 530 is arranged on the second surface 512 of the substrate 510, and the location of the transmitter optical component interface 520 on the first surface 511 of the substrate 510 corresponds to the location of the receiver optical component interface 530 on the second surface 512 of the substrate 510. In the embodiment, as shown in FIG. 7 and FIG. 8, the transmitter optical component interface 520 is arranged on the first surface 511 of the substrate 510 at a location near the edge (the edge is on one side of the substrate 510, called first edge, and the edge that on the other side of the substrate 510 is called second edge), the receiver optical component interface 530 is arranged on the second surface 512 of the substrate 510 at a location near the same edge (i.e., first edge). The transmitter optical component interface 520 and the receiver optical component interface 530 both have a plurality of contacts, and the number of the contacts, the function definition of every contact and the material size of the contact are designed based on the actual demand, which are not specified here.

Figure 9:
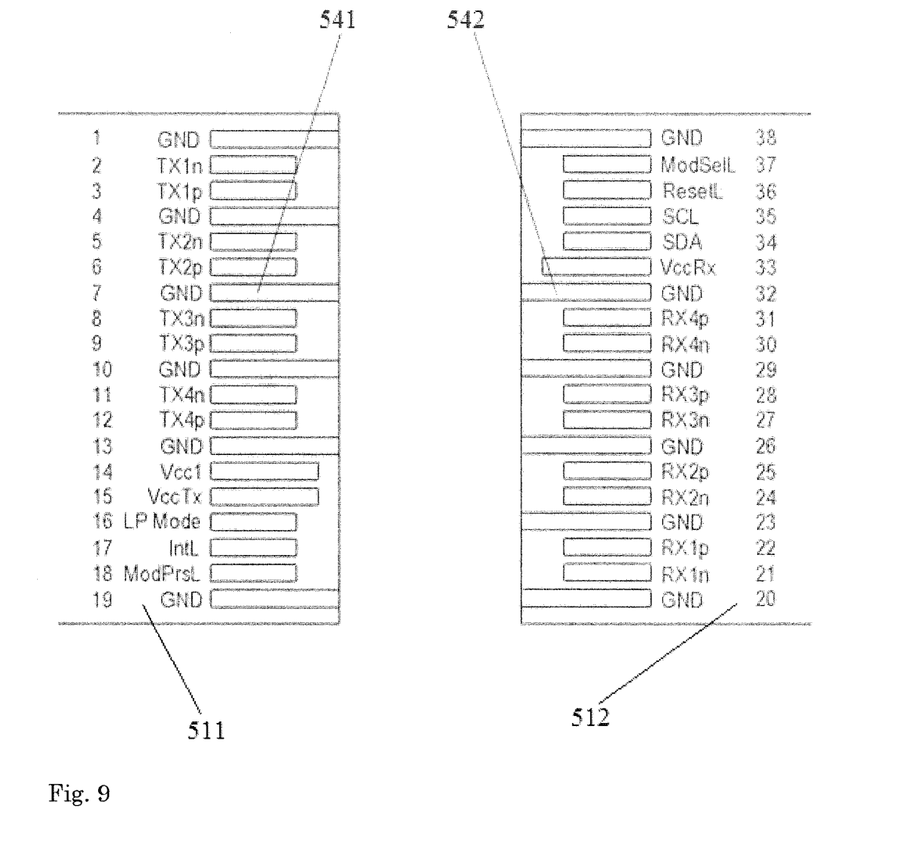
FIG. 9 is a schematic diagram illustrating a definition of an electrical interface of a printed circuit board according to one embodiment of the present disclosure.

The electrical interface 540 includes a transmitter data interface 541 and a receiver data interface 542. The transmitter data interface 541 is arranged on the first surface 511 of the substrate 510, and the receiver data interface 542 is arranged on the second surface 512 of the substrate 510, that is, the transmitter data interface 541 and the transmitter optical component interface 520 are arranged on a same surface of the substrate 510, and the receiver data interface 542 and the receiver optical component interface 530 are arranged on a same surface of the substrate 510. The location of the transmitter data interface 541 on the first surface 511 of the substrate 510 corresponds to the location of the receiver data interface 542 on the second surface 512 of the substrate 510. In the embodiment, as shown in FIGS. 7 and 8, the transmitter data interface 541 is arranged on the second surface 512 of the substrate 510 at a location near the second edge, and the receiver data interface 542 is arranged on the second surface 512 of the substrate 510 at a location near the same edge (i.e., second edge). The transmitter data interface 541 and the receiver data interface 542 both have a plurality of contacts. In one embodiment, the electrical interface 540 of the printed circuit board has 38 contacts, and the function definition of each contact is shown in FIG. 9, which is a schematic diagram illustrating a definition of an electrical interface of a printed circuit board according to one embodiment of the present disclosure. It is understood by those skilled in the art that the electrical interface of the printed circuit board of FIG. 9 is defined by way of example that the number of the contacts, the function definition of every contact and the material size of the contact are designed based on the actual demand, which are not specified here.

The transmitter optical component interface 520 is coupled to the transmitter data interface 541 via the first circuit board wiring 550 and the reference ground (see GND1 in FIG. 8), and a transmitter data transmission path is formed between the transmitter optical component interface 520 and the transmitter data interface 541 for the transmission of the transmitting signal. If the transmitter data interface 541 is a single channel data interface, there is only one transmitter data transmission path formed, and if the transmitter data interface 541 is a multichannel data interface, there may be a plurality of transmitter data transmission paths formed. As shown in FIG. 7, there are 4 transmitter data transmission paths formed between the transmitter optical component interface 520 and the transmitter data interface 541. In one embodiment, the first circuit board wiring 550 may be arranged on the first surface 511. In another embodiment, the first circuit board wiring 550 may also be arranged in a signal layer near the first surface 511 of the substrate 510.

The receiver optical component interface 530 is coupled to the receiver data interface 542 via the second circuit board wiring 560 and the reference ground (see GND2 in FIG. 8), and a receiver data transmission path is formed between the receiver optical component interface 530 and the receiver data interface 542 for the transmission of the receiving signal. If the receiver data interface 542 is a single channel data interface, there is only one receiver data transmission path formed, and if the receiver data interface 542 is a multichannel data interface, there may be a plurality of receiver data transmission paths formed. As shown in FIG. 7, there are 4 receiver data transmission paths formed between the receiver optical component interface 530 and the receiver data interface 542. In one embodiment, the second circuit board wiring 560 may be arranged on the second surface 512. In another embodiment, the second circuit board wiring 560 may also be arranged in a signal layer near the second surface 512 of the substrate 510.

Further, the printed circuit board 50 further includes a transmitted signal processing chip 570 configured to process the transmitting signal, and/or a received signal processing chip 580 configured to process the process the receiving signal. The printed circuit board 50 including a transmitted signal processing chip 570 and a received signal processing chip 580 is taken as an example to illustrate the printed circuit board. Please refer to FIGS. 10-12, FIG. 10 is a structural schematic diagram illustrating a first surface of a printed circuit board according to one embodiment of the present disclosure, FIG. 11 is a structural schematic diagram illustrating a second surface of a printed circuit board according to one embodiment of the present disclosure, and FIG. 12 is a sectional diagram of the printed circuit board according to FIG. 10 and FIG. 11.

Figure 10:
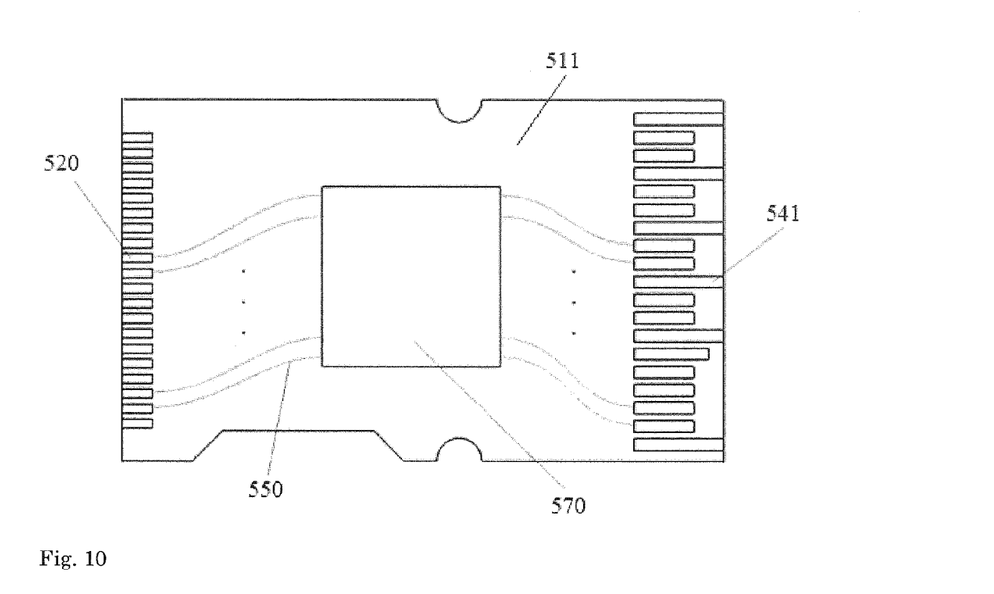
FIG. 10 is a structural schematic diagram illustrating a first surface of a printed circuit board according to one embodiment of the present disclosure.
Figure 11:
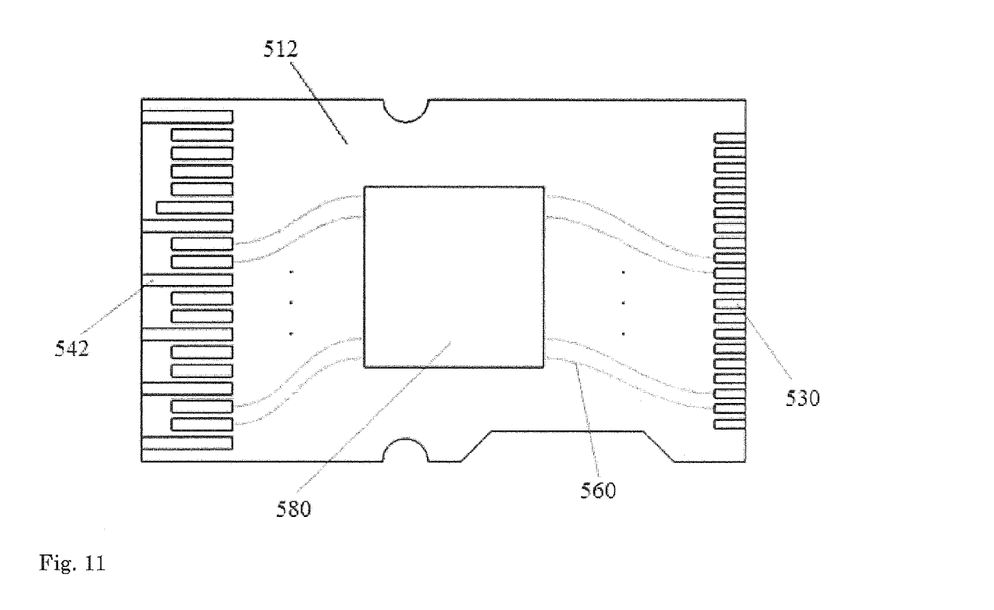
FIG. 11 is a structural schematic diagram illustrating a second surface of a printed circuit board according to one embodiment of the present disclosure.
Figure 12:
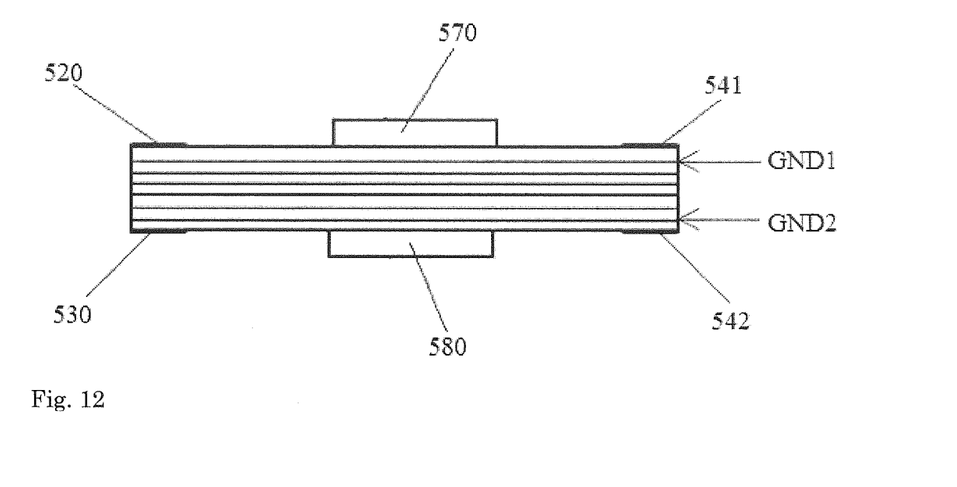
FIG. 12 is a sectional diagram of the printed circuit board according to FIG. 10 and FIG. 11.

As shown in FIGS. 10 and 12, the transmitted signal processing chip 570 is arranged on the first surface 511, including a signal input port (not shown) and a signal output port (not shown), that are coupled to the transmitter data interface 541 and the transmitter optical component interface 520 respectively via the first circuit board wiring 550, to be a part of the transmitter data transmission path. In the embodiment, the transmitted signal processing chip 570 may be a chip selected from the group consisting of clock and data recovery chip, laser driver chip and/or multiplex and de-multiplex chip. In other embodiments, the transmitted signal processing chip 570 may also be other chips for processing the transmitting signal based on the actual demand, and there is no need to enumerate all chips for brevity. As shown in FIGS. 11 and 12, the received signal processing chip 580 is arranged on the second surface 512, including a signal input port (not shown) and a signal output port (not shown), that are coupled to the receiver optical component interface 530 and the receiver data interface 542 and respectively via the second circuit board wiring 560, to be a part of the receiver data transmission path. The received signal processing chip 580 may be a chip selected from the group consisting of clock and data recovery chip, post amplifier chip and/or multiplex and de-multiplex chip. In other embodiments, the received signal processing chip 580 may also be other chips for processing the receiving signal based on the actual demand, and there is no need to enumerate all chips for brevity. For the case that the printed circuit board 50 only includes a transmitted signal processing chip 570 or a received signal processing chip 580, it can refer to the printed circuit board 50 including the transmitted signal processing chip 570 and the received signal processing chip 580, which isn't repeated here.

It is obvious for those skilled in the art that the present disclosure is not limited by the detail of the above exemplary examples, and can be achieved by other specific forms without departing from its spirit or essential features. Thus, the above embodiments are regarded to be exemplary and unrestrictive for every point, and the scope of the present disclosure is defined by the appended claims rather than the foregoing description, so it intends to include the definition of the equivalent elements and all variations in the scope of the claims in the present disclosure. The appended drawing reference signs in the claims should not be regarded as a limitation to the claims. In addition, the term of "include or comprise" does not exclude other components, units or steps, and the singular number does not exclude plural number. The plurality of components, units or devices in a system claim can be achieved by a component, unit or device by software or hardware.

Compared with the current technology, the optical module of the disclosure has the advantage that the transmitter optical component and the receiver optical component can both make the most of the width of the optical module by arranging the transmitter optical component and the receiver optical component into a stack in the optical module. Compared with the optical module in the prior art that the transmitter optical component and the receiver optical component are arranged side by side, the optical module of the disclosure on one hand can accommodate more signal channels or increase the distance between the signal channels to improve the design flexibility of the optical path and the electric circuit in the optical module. On the other hand, it can form a thermal path with a large area, which is beneficial to the heat dissipation of the transmitter optical component and the receiver optical component, to improve the heat dissipation effect of the optical module. In addition, by arranging the transmitter optical component interface and the transmitter data interface in the electrical interface on one surface of the printed circuit board and forming a transmitter data transmission path accordingly, and by arranging the receiver optical component interface and the receiver data interface in the electrical interface on the other surface of the printed circuit board and forming a receiver data transmission path accordingly, the transmitter data transmission path and the receiver data transmission path are formed on two surfaces of the printed circuit board and in the signal layers near the two surfaces respectively, to ensure there is no intersection between the transmitter data transmission path and the receiver data transmission path, in this way, on one hand, it can effectively reduce or even substantially eliminate the crosstalk between the transmitter data transmission path and the receiver data transmission path, and on the other hand, it can effectively reduce the height and number of the via holes in the printed circuit board, or even substantially eliminate the via hole, to greatly improve the signal integrity.

The embodiments are chosen and described in order to explain the principles of the disclosure and their practical application so as to activate others skilled in the art to utilize the disclosure and various embodiments. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An optical module, comprising an optical module housing, an optical fiber connector, a transmitter optical component, a receiver optical component and a printed circuit board, wherein the optical fiber connector, the transmitter optical component, the receiver optical component and the printed circuit board are arranged within the optical module housing, the optical fiber connector includes a transmitting interface optically coupled with the transmitter optical component, and a receiving interface optically coupled with the receiver optical component, and the transmitting interface and the receiving interface are arranged side by side to form a horizontal arrangement, the transmitter optical component and the receiver optical component are optically coupled to the optical fiber connector, and electrically connected to the printed circuit board, the printed circuit board is arranged along a horizontal direction within the optical module housing, the transmitter optical component including a transmitter optical component housing and a light-emitting device group arranged within the transmitter optical component housing, the receiving optical component including a receiver optical component housing and a light-receiving device group arranged within the receiver optical component housing, and the transmitter optical component housing of the transmitter optical component and the receiver optical component housing of the receiver optical component are stacked in a direction perpendicular to the horizontal direction along which the printed circuit board is arranged.

2. The optical module of claim 1, wherein the transmitter optical component further comprises a first optical path coupling device and a first printed circuit board signal connector, wherein the light-emitting device group is optically coupled to the optical fiber connector via the first optical path coupling device, and the light-emitting device group is electrically connected to the printed circuit board via the first printed circuit board signal connector; and the receiver optical component further comprises a second optical path coupling device and a second printed circuit board signal connector, wherein the light-receiving device group is optically coupled to the optical fiber connector via the second optical path coupling device, and the light-receiving device group is electrically connected to the printed circuit board via the second printed circuit board signal connector.

3. The optical module of claim 2, wherein the first printed circuit board signal connector and the second printed circuit board signal connector are flexible printed circuit boards.

4. The optical module of claim 2, wherein the first optical path coupling device comprises a first light-plane convertor configured to convert and connect the light plane, the first light-plane convertor located between the light-emitting device group and the optical fiber connector; and/or the second optical path coupling device comprises a second light-plane convertor configured to convert and connect the light plane, and second light-plane convertor located between the light-receiving device group and the optical fiber connector.

5. The optical module of claim 1, wherein the optical module housing comprises an upper housing and a lower housing;

the transmitter optical component housing is in direct contact with the upper housing, or in heat-transfer contact with the upper housing via heat conduction material; and the receiver optical component housing is in direct contact with the lower housing or in heat-transfer contact with the lower housing via heat conduction material.

6. The optical module of claim 1, wherein the printed circuit board comprises a substrate, a transmitter optical component interface, a receiver optical component interface, an electrical interface, a first circuit board wiring and a second circuit board wiring, the electrical interface comprising a transmitter data interface and a receiver data interface;

the substrate comprises a first surface and a second surface opposite to the first surface;

the transmitter optical component interface is coupled to the first printed circuit board signal connector to form the electric connection, and the transmitter optical component interface and the transmitter data interface are arranged on the first surface and coupled with each other via the first circuit board wiring to form a transmitter data transmission path; and the receiver optical component interface is coupled to the second printed circuit board signal connector to form the electric connection, and the receiver optical component interface and the receiver data interface are arranged on the second surface and coupled with each other via the second circuit board wiring to form a receiver data transmission path.

7. The optical module of claim 6, wherein the first circuit board wiring is arranged on the first surface; and/or the second circuit board wiring is arranged on the second surface.

8. The optical module of claim 6, wherein the substrate has a multi-layer pressured laminated structure.

9. The optical module of claim 6, wherein the printed circuit board further comprises a transmitted signal processing chip which is arranged on the first surface and coupled to the transmitter optical component interface and the transmitter data interface respectively via the first circuit board wiring; and/or a received signal processing chip which is arranged on the second surface and coupled to the receiver optical component interface and the receiver data interface respectively via the second circuit board wiring.

10. The optical module of claim 9, wherein the transmitted signal processing chip is any one of the group consisting of clock and data recovery chip, laser driver chip and/or multiplex and de-multiplex chip; and the received signal processing chip is any one of the group consisting of clock and data recovery chip, post amplifier chip and/or multiplex and de-multiplex chip.

* * * * *

UNITED STATES PATENT AND TRADEMARK OFFICE
CERTIFICATE OF CORRECTION

PATENT NO. : 9,866,328 B2
APPLICATION NO. : 14/699796
DATED : January 9, 2018
INVENTOR(S) : Xiangzhong Wang et al.

It is certified that error appears in the above-identified patent and that said Letters Patent is hereby corrected as shown below:

In the Claims

In Claim 4, Column 13, Line 45, "convertor" should read as --converter--

In Claim 4, Column 13, Line 47, "convertor" should read as --converter--

In Claim 4, Column 13, Line 50, "convertor" should read as --converter--

In Claim 4, Column 13, Line 51-52, "convertor" should read as --converter--

Signed and Sealed this
Fifth Day of June, 2018

Andrei Iancu
*Director of the United States Patent and Trademark Office*